United States Patent Office 3,062,811
Patented Nov. 6, 1962

3,062,811
PROCESS FOR THE PREPARATION OF SALTS
OF PENICILLIN
Anthony F. De Rose, Chicago, Ill., assignor to Abbott Laboratories, North Chicago, Ill., a corporation of Illinois
No Drawing. Filed Sept. 12, 1956, Ser. No. 609,345
5 Claims. (Cl. 260—239.1)

This invention relates to the preparation of relatively pure compounds containing the dehydroabietylamine group and more particularly to an improved process of preparing relatively pure dehydroabietyl-lower alkylenediamine penicillin compounds.

The hydroabietyl alkylenediamines have been found to form sparingly water-soluble salts when reacted with a penicillin acid. Of the several hydroabietyl alkylenediamine bases available, the dehydroabietyl alkylenediamines have been found to form salts with a penicillin acid which have unique therapeutic properties and solubility characteristics which distinguish them from the corresponding dihydroabietyl and tetrahydroabietyl alkylenediamine penicillin salts. For example, the N,N'-bis-(dehydroabietyl)-ethylenediamine-dipenicillin G is a stable, non-toxic, sparingly soluble salt which is particularly useful as a means of administering penicillin G orally and parenterally, especially where it is desired to maintain therapeutic penicillin blood levels for a prolonged period.

A preferred method of preparing the dehydroabietyl alkylenediamines of the present invention comprises treating two moles of dehydroabietylamine dissolved in an inert organic solvent therefor, such as xylene, with one mole of an alkylene dihalide, such as ethylene dibromide, and refluxing the mixture to obtain the corresponding dehydroabietyl alkylenediamine. Another method of preparing the herein disclosed base comprises reacting dehydroabietylamine with a sulfate or sulfonate of an aliphatic composition such as ethylene paratoluenesulfonate, to obtain the corresponding dehydroabietyl ethylenediamine. The insoluble penicillin salts with which the present invention is principally concerned are then prepared from the said alkylenediamine bases by reacting the herein described amine bases or the acid or quaternary ammonium salt thereof with an excess of any desired penicillin acid in a suitable reaction solvent.

The principal source of the dehydroabietylamine group used in the preparation of the above improved penicillin salts is the primary amine dehydroabietylamine which is a unique tricyclic ring system containing two saturated and one unsaturated rings having the following formula:

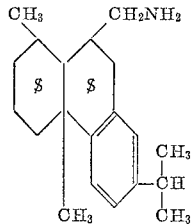

Dehydroabietylamine is sold commercially as "Rosin Amine D" by the Hercules Powder Company and the commercial product is comprised of about 70% dehydroabietylamine and about 30% dihydroabietylamine and tetrahydroabietylamine. Since the several primary amines present in "Rosin Amine D" have very similar physical properties, it is not commercially practicable to isolate pure dehydroabietylamine by commercial distillation procedures. And, while it is possible to obtain pure dehydroabietylamine from commercial "Rosin Amine D," the expense involved therein serves as a deterrent to the commercial utilization of compounds containing dehydroabietylamine groups where it is undesirable or detrimental to have dihydroabietyl and tetrahydroabietyl amine groups present.

It is, therefore, an object of this invention to provide an economical method of preparing penicillin salts containing dehydroabietylamine groups substantially free of dihydroabietylamine and tetrahydroabietylamine groups.

It is also an object of the invention to provide a more economical method of preparing N,N'-bis-(dehydroabietyl)-alkylenediamine-di-penicillin salts uncontaminated with substantial amounts of the N,N'-bis-dihydroabietyl) - alkylenediamine - di - penicillin and N,N' - bis- (tetrahydroabietyl)-alkylenediamine-di-penicillin salts.

It is a further object of the present invention to provide a direct method of preparing stable N,N'- bis-(dehydroabietyl)-alkylenediamine-di-penicillin salts having a high degree of purity from a mixture of amine bases containing the dehydro, dihydro and tetrahydro amine bases.

It is still a further object of the present invention to provide an economical method of preparing N,N'-bis-(dehydroabietyl)-alkylenediamine-di-penicillin salt from a mixture containing the corresponding N,N'-bis-(dehydroabietyl) - alkylenediamine - di - penicillin, N,N' - bis- (dihydroabietyl)-alkylenediamine-di-penicillin, and N,N'- bis - (tetrahydroabietyl) - alkylenediamine - di - penicillin.

It is another object of the present invention to provide a process of preparing substantially pure N,N'-bis-(dehydroabietyl)-ethylenediamine from a mixture containing de, di, and tetrahydroabietyl ethylenediamine compounds.

Other objects of the invention will be apparent from the detailed description and claims to follow.

Applicant has discovered that the N,N'-bis(dehydroabietyl)-lower alkylenediamine-di-benzylpenicillin salts, such as N,N'-bis-(dehydroabietyl)-ethylenediamine-di-benzylpenicillin, can be obtained in a substantially pure form from a mixture containing impurities comprising appreciable amounts of the N,N'-bis-(dihydroabietyl)- lower alkylenediamine and N,N'-bis-(tetrahydroabietyl)- lower alkylenediamine penicillin salts by contacting a mixture thereof with the solvent comprising essentially n-butanol which has highly selective solubility characteristics. Thus, it has been found that when a mixture comprising of a major proportion of the said dehydroabietyl lower alkylenediamine penicillin salts and a minor proportion of dihydroabietyl- and tetrahydroabietyl-lower alkylenediamine penicillin salts are crystallized from a solution in which the solvent is primarily n-butanol, a well defined crystalline precipitate is formed which comprises approximately a 90% pure N.N'-bis-(dehydroabietyl)-lower-alkylenediamine-di-benzyl-penicillin salt. The desired selective separation of the said dehydroabietyl penicillin salt is preferably obtained by reacting the said dehydroabietyl lower alkyl diamine dissolved in n-butanol with an n-butanol solution of penicillin so as to form the said dehydroabietyl - lower alkylenediamine - di - benzylpenicillin salt in situ and thereafter allow the desired dehydroabietyl penicillin salt to precipitate from the n-butanol solution while the dihydroabietyl- and teterahydroabietyl- lower alkylenediamine-di-benzylpenicillin salts remain dissolved in the said n-butanol solvent. It is also within the scope of the present invention, however, to prepare the mixture of predominantly dihydroabietyl lower alkylenediamine penicillin salt admixed with minor proportions of the dihydroabietyl- and tetrahydroabietyl- lower alkylenediamine penicillin salts in a reaction solvent other than n-butanol and thereafter recrystallize the crude mixture having approximately the foregoing composition from n-butanol. In the preferred embodiment the hydroabietyl-lower alkylenediamine-di-benzylpenicillin salt mixture has a concentration of approximately 2 kg. of the said crude mixture per 8 liters of n-butanol. If, desired, the filtration from which the precipitated dehydroabietyl-lower alkylenediamine penicillin salts are separated and which contains appreciable amounts of dihydroabietyl-lower alkylenediamine penicillin salt and the tetrahydroabietyl-lower alkylenediamine penicillin salt can be treated to recover the penicillin and the dihydroabietyl alkylenediamine and the tetrahydro alkylenediamine compounds substantially free of dehydroabietyl alkylenediamine.

The following specific example will illustrate the preferred embodiment of the present invention, but should not be construed to limit the invention to the precise proportions employed nor the specific procedure outlined.

EXAMPLE I

*N,N'-Bis-(dehydroabietyl)-ethylenediamine-di-penicillin G*

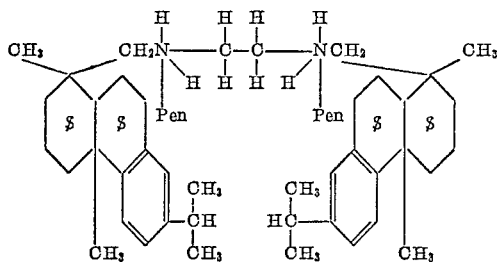

The impure dihydrochlorides of the ethylenediamine bases (1.15 kg.), including a major proportion of N,N'-bis-(dehydroabietyl) - alkylenediamine - dihydrochloride monohydrate, is suspended in 4 liters of water and the pH is adjusted to about pH 10 by the addition of 6 N sodium hydroxide. The free base, N,N'-bis-(dehydroabietyl)-alkylene-diamine, is then extracted into 4 liters of n-butanol. The extraction is repeated using about 1 liter of n-butanol. The n-butanol extracts are combined, washed with 0.1 volume of water, treated with 1% (w./v.) carbon (Nuchar C-190N or Darco G-60) and clarified by filtration.

A solution of penicillin acid in n-butanol is obtained by extracting 2.3 kg. crude procaine penicillin (85-90% pure) with 3 liters of aqueous n-butanol using 6 N sulfuric acid to adjust the pH to about pH 2. The extraction of the procaine penicillin is repeated with 2 liters of the aqueous n-butanol. The extracts of penicillin are combined and the resulting solution is washed free of excess mineral acid and by-products with 0.1 volume of water. A clarified solution of penicillin acid in n-butanol is obtained by filtering the solution after treating with 1% solution of carbon as described in the preceding paragraph.

The solution of the said N,N'-bis-(dehydroabietyl)-ethylenediamine in n-butanol is then added slowly to the n-butanol solution of penicillin acid and the combined solutions agitated thoroughly. The resulting clear solution soon develops many small crystals. The crystallization is allowed to proceed undisturbed at a temperature of 5° C. until crystallization is complete. After the solution has been allowed to stand for about 12 hours, the crystalline mass is agitated and filtered. The crystals are washed with 0.1 volume of n-butanol followed by washing sufficiently with acetone to render the wash liquor substantially colorless. The crystals are dried for about 15 hours at 50° C. under a pressure of about 0.1 mm. to produce highly purified N,N'-bis-(dehydroabietyl)-alkylenediamine-di-benzylpenicillin which melts on a microblock with decomposition at a temperature of 165-167° C. and has a potency of 917 u./mg. when determined by chemical assay. On chemical analysis the product is found to contain 70.17% C, 8.21% H, 6.55% N, as compared with a theoretical analysis of 70.22% C, 7.96% H, and 6.64% N.

The N,N'-bis-(dehydroabietyl)-lower-alkylenediamine-di-benzylpenicillin salts prepared in the foregoing manner, in addition to having a purity which enables them to be used in pharmaceutical preparations without further purification, are formed as dense rhomohedron shaped crystals which are readily handled and do not require special filtration procedure or apparatus.

EXAMPLE II

*N,N'-Bis-(dehydroabietyl)-ethylenediamine-di-phenoxymethyl penicillin (penicillin V)*

The dihydrochloride of the said dehydroabietyl-ethylenediamine base, 57.5 mg., is suspended in 200 ml. of water and the pH is adjusted to about pH 10 by the addition of 6 N sodium hydroxide. The free base, N,N'-bis-(dehydroabietyl)-ethylenediamine, is then extracted into 200 ml. of n-butanol. The extraction is repeated using about 50 ml. of n-butanol. The n-butanol extracts are combined, washed with 0.1 volume of water, treated with 1% (w./v.) carbon (Nuchar C-190N or Darco G-60) and clarified by filtration. The water dissolved in the butanol solution of the base is removed by distillation.

A solution of phenoxymethyl penicillin acid (penicillin V acid (in n-butanol is obtained by extracting 74 mg. of potassium phenoxymethyl penicillin with 150 ml. of aqueous n-butanol using 6 N sulfuric acid to adjust the pH to about pH 2. The extraction of the potassium penicillin V is repeated with 100 ml. of the aqueous n-butanol. The extracts of penicillin V acid are combined and the resulting solution is washed free of excess mineral acid and by-products with 0.1 volume of water. A clarified solution of penicillin V acid in n-butanol is obtained by filtering the solution after treating with 1% solution of carbon as described in the preceding paragraph. The water dissolved in the butanol solution of penicillin V acid is removed by distillation at reduced pressure.

The anhydrous solution of the said N,N'(dehydroabietyl)-ethylenediamine in n-butanol is then added slowly to the anhydrous n-butanol solution of pencillin V acid and the combined solutions agitated thoroughly. The resulting clear solution soon develops many small crystals. The crystallization is allowed to proceed undisturbed at a temperature of 5° C. until crystallization is complete. After the solution has been allowed to stand for about 12 hours, the crystalline mass is agitated and filtered. The crystals are washed with 0.1 volume of n-butanol followed by washing sufficiently with acetone to render the wash liquor substantially colorless. The crystals are dried for about 15 hours at 50° C. under a pressure of about 0.1 mm. to produce the salt, N,N'-bis-(dehydroabietyl) - ethylenediamine-di-phenoxymethyl penicillin, which melts on a Fischer-Johns microblock with decomposition at a temperature of 163-165° C. and has a potency of 925 u./mg. when determined by chemical assay. On chemical analysis the product is found to contain 68.78% C, 7.94% H and 6.47% N, as compared with a theoretical analysis of 68.48% C, 7.77% H and 6.48% N. The said penicillin V salt has solubility in water at 25° C. of about 100 u./mg., based on bioassay using penicillin V as standard.

EXAMPLE III

*N,N'-Bis-(dehydroabietyl)-ethylenediamine-di-phenylmercaptomethyl Penicillin*

A solution of phenylmercaptomethyl penicillin acid (penicillin S acid) in n-butanol is obtained by extracting 100 gms. of potassium phenylmercaptomethyl penicillin with 600 cc. of aqueous n-butanol using 6 N sulfuric acid to adjust the pH to about 2. The extraction of the potassium penicillin S is repeated with 200 ml. of aqueous n-butanol. The extracts of penicillin S acid are combined and the resulting solution is washed free of excess mineral acid and other undesired products with 0.1 volume of water. A clarified solution of penicillin S acid in n-butanol is obtained by filtering the solution after treating with a 1% solution of activated carbon, such as Darco G-60. The water in the n-butanol solution of penicillin S acid is removed by distillation at reduced pressure.

An anhydrous solution of 73 grms. of N,N'-bis-(dehydroabietyl)ethylenediamine, as prepared in Example V, in about 200 cc. of n-butanol is then added slowly to the above anhydrous n-butanol solution of penicillin S acid (90 gms.) and the combined solutions agitated thoroughly. The resulting clear solution is then stored at about 5° C. for 8 hours during which crystallization is completed. The crystalline mass is agitated and filtered. The crystals are then washed with three 200 cc. portions of cold n-butanol and dried in vacuum over silica gel to yield the salt, N,N'-bis(dehydroabietyl)-ethylenediamine-di-phenylmercaptomethyl penicillin, which melts on a Fischer-Johns microblock with decomposition at a temperature of 159–163° C. and has a potency of 2,120 u./mg. when determined by bioassay. On chemical analysis the product is found to contain 66.56% C, 7.84% H, 6.32% N and 9.80% S, as compared with a theoretical analysis of 66.83% C, 7.55% H, 6.32% N and 9.65% S. The said penicillin S salt has a solubility in water at 25° C. of about 50 u./mg.

EXAMPLE IV

N,N'-Bis-(dehydroabietyl)-ethylenediamine

A mixture of 142.5 gms. of "Rosin Amine D" containing about 70% dehydrobietylamine and 30% dihydroabietylamine and tetrahydroabietylamine, 47.0 gms. of ethylene dibromide, and 60.6 gms. of triethylamine is dissolved in 350 cc. of anhydrous xylene and refluxed for about 16 hours. Thereafter the triethylamine dibromide salt formed is separated from the solution by filtering the cool reaction mixture and washing with ether. The solution is then concentrated under reduced pressure to dryness to remove the ether, xylene and excess triethylamines present. The viscous oil resin is slurried twice with 250 cc. portions of methanol to remove any unreacted primary amines. The oil residue after being washed with methanol is dissolved in ethyl alcohol and 75 cc. of concentrated hydrochloric acid is added dropwise to the warm alcohol solution of the base. The dihydrochloride salts of the several hydroabietyl ethylenediamines precipitates immediately from solution. The salt is then separated by filtering and is washed twice with 100 cc. portions of cooled ethyl alchol. The dihydrochloride salts of the dehydroabietyl, dihydroabietyl and tetrahydroabietyl ethylenediamine mixture have a melting point of about 292–295° C. On subjecting the mixture to solubility analyses it is found that the dehydroabietyl ethylenediamine is present in substantially the same proportions as is the dehydroabietylamine in the original "Rosin Amine D."

EXAMPLE V

N,N'-Bis-dehydroabietyl ethylenediamine

The compound N,N'-bis-(dehydroabietyl)-di-benzylpenicillin is treated in a chloroform-water solution with sufficient sodium carbonate to raise the pH of the solution to about pH 9.5. The penicillin molecule which separates from the ethylenediamine-penicillin salt is extracted into the aqueous phase as the sodium penicillin salt and the compound N,N'-bis-(dehydroabietyl)-ethylenediamine base is extracted into the chloroform phase. The said dehydroabietyl ethylenediamine is recovered by drying the chloroform solution until free of chloroform and thereafter treating the dried base with methanol-hydrochloric acid solution to convert the said base to the dihydorchloride. The dihydrochloride salt of N,N'-bis-(dehydroabietyl)-ethylenediamine is filtered and dried and is found to have a melting point of 295–297° C.

It will be apparent that the foregoing procedure enables the preparation of substantially pure N,N'-bis-(dehydroazietyl)-ethylenediamine base uncontaminated by appreciable quantities of the dihydroabietyl ethylenediamine and the tetrahydroabietyl ethylenediamine.

Whereas the preferred embodiment of the present invention employs the ethylene radical in preparing the N,N'-bis(dehydroabietyl)-lower alkylenediamine compound, it should be understood the other lower alkylene groups having up to 8 carbon atoms per molecule can be employed in the present invention.

While the present invention has been illustrated with insoluble salts of penicillin G, it should be understood that other penicillins can be employed with equal facility to produce insoluble penicillin salts of N,N'-bis-(dehydroabietyl)-ethylenediamine and equivalent N,N' - bis - (dehydroabietyl)-lower alkylenediamines. Thus stable insoluble salts of penicillin O, penicillin F, penicillin X, penicillin K and biosynthetic penicillins are within the scope of the present invention.

It will be apparent from the foregoing description that the present invention provides, in addition to other advancements, a very economical and expedient method of preparing the insoluble salts of penicillin containing dehydroabietylamine groups substantially free of dihydroabietyl and tetrahydroabietyl groups normally present in the available commercial sources of dehydroabietylamine and eliminates the necessity of separating dehydroabietylamine from dihydroabietylamine and tetrahydroabietylamine. It is thus made economically feasible to utilize for pharmaceutical preparations and other nonpharmaceutical uses the insoluble penicillin salts containing dehydroabietylamine groups essentially uncontaminated with dihydroabietyl and tetrahydroabietyl ethylenediamine groups.

The present application is a continuation-in-part application of the inventor's co-pending application Serial No. 485,811, filed February 2, 1955, now abandoned.

Others may readily adapt the invention for use under various conditions of service, by employing one or more of the novel features disclosed or equivalents thereof. As at present advised with respect to the apparent scope of my invention, I desire to claim the following subject matter.

I claim:

1. In a process of preparing an N,N'-bis(dehydroabietyl)-alkylenediamine-di-penicillin salt having improved purity and stability, the steps comprising: mixing an n-butanol solution of a mixture of a major proportion of an N,N'-bis-,dehydroabietyl)-lower alkylenediamine and a minor proportion of an N,N'-bis-(dihydroabietyl)-lower alkylenediamine and an N,N'-bis-(tetrahydroabietyl)-lower alkylenediamine with an n-butanol solution of penicillin, whereupon the penicillin salts of the said alkylenediamines are formed; allowing the said penicillin salts to remain in contact with the n-butanol solution until precipitation of the penicillin salt of N,N'-bis-(dehydroabietyl)-lower alkylenediamine is substantially complete; and recovering the penicillin salt of the said dehydroabietyl-lower alkylenediamine which forms as a crystalline precipitates substantially free of impurities.

2. In a process of preparing the N,N'-bis-(dehydroabietyl)-ethylenedaimine-di-penicillin G salt having improved purity and stability, the steps comprising: mixing an n-butanol solution of a mixture of a major proportion of N,N'-bis-(dehydroabietyl)-ethylenediamine and a minor proportion of N,N'-bis-(dihydroabietyl)-ethylenediamine and N,N' - bis-(tetrahydroabietyl) - ethylenediamine with an n-butanol solution of penicillin G, whereupon the penicillin G salts of the said ethylenediamines are formed; allowing the said penicillin G salts to remain on contact with the n-butanol solution until precipitation of the penicillin G salt of N,N'-bis-(dehydroabietyl)-ethylenediamine is substantially complete; and recovering the N,N'-bis-(dehydroabietyl)-ethylenediamine-di-penicillin G which forms as a crystalline precipitate substantially free of impurities.

3. In a process of preparing the N,N'-bis-(dehydroabietyl)-ethylenediamine-di-phenoxymethyl penicillin salt having improved purity and stability, the steps comprising: mixing an n-butanol solution of a mixture of a major proportion of N,N'-bis-(dehydroabietyl)-ethylenediamine and a minor proportion of N,N'-bis-(dihydroabietyl) - ethylenediamine and N,N' - bis - (tetrahydroabietyl)-ethylenediamine with an n-butanol solution of phenoxymethyl penicillin, whereupon the phenoxymethyl penicillin salts of the said ethylenediamines are formed; allowing the said phenoxymethyl penicillin salts to remain on contact with the n-butanol solution until precipitation of the phenoxymethyl penicillin salt of N,N'-bis-(dehydroabietyl)-ethylenediamine is substantially complete; and recovering the N,N' - bis - (dehydroabietyl) - ethylenediamine-di-phenoxymethyl penicillin which forms as a crystalline precipitate substantially free of impurities.

4. In a process of preparing the N,N'-bis-(dehydroabietyl)-ethylenediamine-di-phenylmercaptomethyl penicillin salt having improved purity and stability, the steps comprising: mixing an n-butanol solution of a major proportion of N,N'-bis-(dehydroabietyl)-ethylenediamine and a minor proportion of N,N'-bis-(dihydroabietyl)-ethylenediamine and N,N'-bis-(tetrahydroabietyl)-ethylenediamine with an n-butanol solution containing phenylmercaptomethyl penicillin, whereupon the phenylmercaptomethyl penicillin salts of the said ethylenediamines are formed; allowing the said phenylmercaptomethyl penicillin salts to remain on contact with the n-butanol solution until precipitation of the phenylmercaptomethyl penecillin salt of N,N'-bis-(dehydroabietyl)-ethylenediamine is substantially complete; and recovering the N,N'-bis - (dehydroabietyl) - ethylenediamine - di - phenylmercaptomethyl penicillin which forms as a crystalline precipitate substantially free of impurities.

5. The process as in claim 4 wherein at least about 4 liters of n-butanol are used for every kilogram of the mixture of the penicillin salts of the said ethylenediamines.

References Cited in the file of this patent

UNITED STATES PATENTS

| 2,585,436 | Cheney | Feb. 12, 1952 |
| 2,812,325 | Cheney | Nov. 5, 1957 |
| 2,812,326 | De Rose | Nov. 5, 1957 |

FOREIGN PATENTS

| 753,739 | Great Britain | Aug. 1, 1956 |

OTHER REFERENCES

Abraham et al.: "Biochem. J.," vol. 58, September 1954, page 97.